(12) United States Patent
Huang (10) Patent No.: US 6,388,415 B1
(45) Date of Patent: May 14, 2002

(54) SYSTEM AND METHOD FOR CONTROLLING A STEP MOTOR IN A SCANNER

(75) Inventor: Hal Huang, Hsin Chu (TW)

(73) Assignee: Realtek Semi-Conductor Co., Ltd., Hsin Chu (TW)

( * ) Notice: Subject to any disclaimer, the term of this patent is extended or adjusted under 35 U.S.C. 154(b) by 0 days.

(21) Appl. No.: 09/684,307

(22) Filed: Oct. 6, 2000

(51) Int. Cl.$^7$ .............................................. G05B 19/40
(52) U.S. Cl. ....................................... 318/685; 318/696
(58) Field of Search .................................. 318/685, 696

(56) References Cited

U.S. PATENT DOCUMENTS

| | | | |
|---|---|---|---|
| 4,175,268 A | * 11/1979 | Ochi et al. ...................... 358/44 |
| 4,506,201 A | * 3/1985 | Tsuneki ......................... 318/603 |
| 4,800,482 A | * 1/1989 | Hosaka et al. ............... 364/140 |
| 5,047,871 A | * 9/1991 | Meyer et al. ................. 358/486 |
| 5,583,620 A | * 12/1996 | Miyamoto ................... 355/235 |
| 6,147,776 A | * 11/2000 | Sakurai et al. .............. 358/471 |
| 6,184,646 B1 | * 2/2001 | Yagoshi et al. ............. 318/696 |

* cited by examiner

Primary Examiner—Robert E. Nappi
Assistant Examiner—Rina I. Duda
(74) Attorney, Agent, or Firm—Bacon & Thomas (57) ABSTRACT

A method for controlling a step motor of a scanner by using three sets of parameters is provided. The three sets of parameters include a pulse count number PCN, a count base CB, and a motor constant speed interval MCSI. The method includes the follow steps. First, generate a synchronous trigger signal in correspondence with each exposure trigger signal CVTR generated by an image sensing module of the scanner and clear a base accumulator BA. Then, add the count base CB to the base accumulator in correspondence with each reference pulse. Finally, generate an asynchronous trigger signal and clear the base accumulator when the base accumulator is greater than or equal to the pulse count number PCN. Since the speed of the step motor only relates to the pulse count number PCN and the count base CB, the step motor can be controlled by only setting these parameters.

12 Claims, 9 Drawing Sheets

SYSTEM AND METHOD FOR CONTROLLING A STEP MOTOR IN A SCANNER

BACKGROUND OF THE INVENTION (a) Field of the Invention

The invention relates to a system and method for controlling a motor, especially for controlling a step motor in a scanner using less parameter.

(b) Description of the Related Art

In general, a scanner employs a step motor to move a carriage with an image-sensing module. In order to accelerate the carriage to a desired speed, a control method of linear acceleration is used to overcome the inertia and the friction force of the carriage. If a system does not use the control method of linear acceleration to drive the step motor, the step motor is not easy to operate at a relative high speed.

However, in a control method of linear acceleration currently used in a scanner, seven control parameters are needed to control the motor. These control parameters include a motor movement trigger interval MMTI, a motor movement pattern table MMPT, a motor movement pattern table length MMPTL, a motor stop interval MSI, a motor counterclockwise interval MRI, a motor speed-down interval MSDI, and a motor speed-down ratio MSDR. Due to that these parameters are influenced by each other, it is needed to reset the parameters in different scanners. In addition, since the number of the parameters is seven, which is a relative large number, it is time-consuming to design different types of scanners.

SUMMARY OF THE INVENTION

In view of the above mentioned problems, this invention provides a system and method for controlling a step motor in a scanner by only three control parameters.

This Invention provides methods for controlling the step motor by only three parameters, including a pulse count number PCN, a count base CB, and a motor constant speed Interval MCSI. The method includes the following steps. First, generate a synchronous trigger signal to the motor in correspondence with each exposure trigger signal generated by CVTR (CVTR is the transfer clock, which transfers the carrier to the shift register. In U.S. Pat. No. 4,175,268, the signal of FIG. 12A is the same as CVTR, but the phase is inverted.) and clear the base accumulator BA. Second, add the count base CB to the base accumulator BA in correspondence with each reference pulse. For example, if BA=0 initially and CB=2, after 3 reference pulses, BA will equal to 2+2+2=6. Finally, generate an asynchronous trigger signal and clear the base accumulator BA when the base accumulator BA is greater than or equal to the pulse count number PCN.

The method of the invention also controls the back-tracking operation of the step motor by the temporary count base TCB. The steps include:

(a) assign the count base CB to the temporary count base TCB and enable a clockwise rotation flag;

(b) perform a speed-down control by repeatedly executing a sub-procedure A which will be explained later and subtracting 1 from the temporary count base TCB until the temporary count base TCB becomes 0;

(c) perform a counterclockwise speed-up control by disabling the clockwise rotation flag and repeatedly executing the sub-Procedure A and adding 1 to the temporary count base TCB until the temporary count base TCB is equal to the count bass CB;

(d) perform a counterclockwise constant-speed control by repeatedly executing the sub-procedure A for the times stored in the motor constant speed interval MCSI;

(e) perform a counterclockwise speed-down control by repeatedly executing the sub-procedure A and subtracting 1 from the temporary count base TCB until the temporary count base TCB becomes 0;

(f) perform a clockwise speed-up control by enabling the clockwise rotation flag as soon as an enable signal is received, and repeatedly executing the sub-procedure A and adding 1 to the temporary count base TCB until the temporary count base TCB is equal to the count base CB; and (g) perform a clockwise constant-speed control by repeatedly executing the sub-procedure A for the times stored in the motor constant speed interval MCSI.

The sub-procedure A includes the following steps.

(a) add temporary count base TCB to the base accumulator BA in correspondence with each reference pulse; and (b) generate an asynchronous trigger signal and clear the base accumulator when the base accumulator is greater than or equal to the pulse count number PCN.

DETAIL DESCRIPTION OF THE INVENTION

A preferred embodiment of the Invention will be described with reference to the accompanying drawings.

Figure 13:
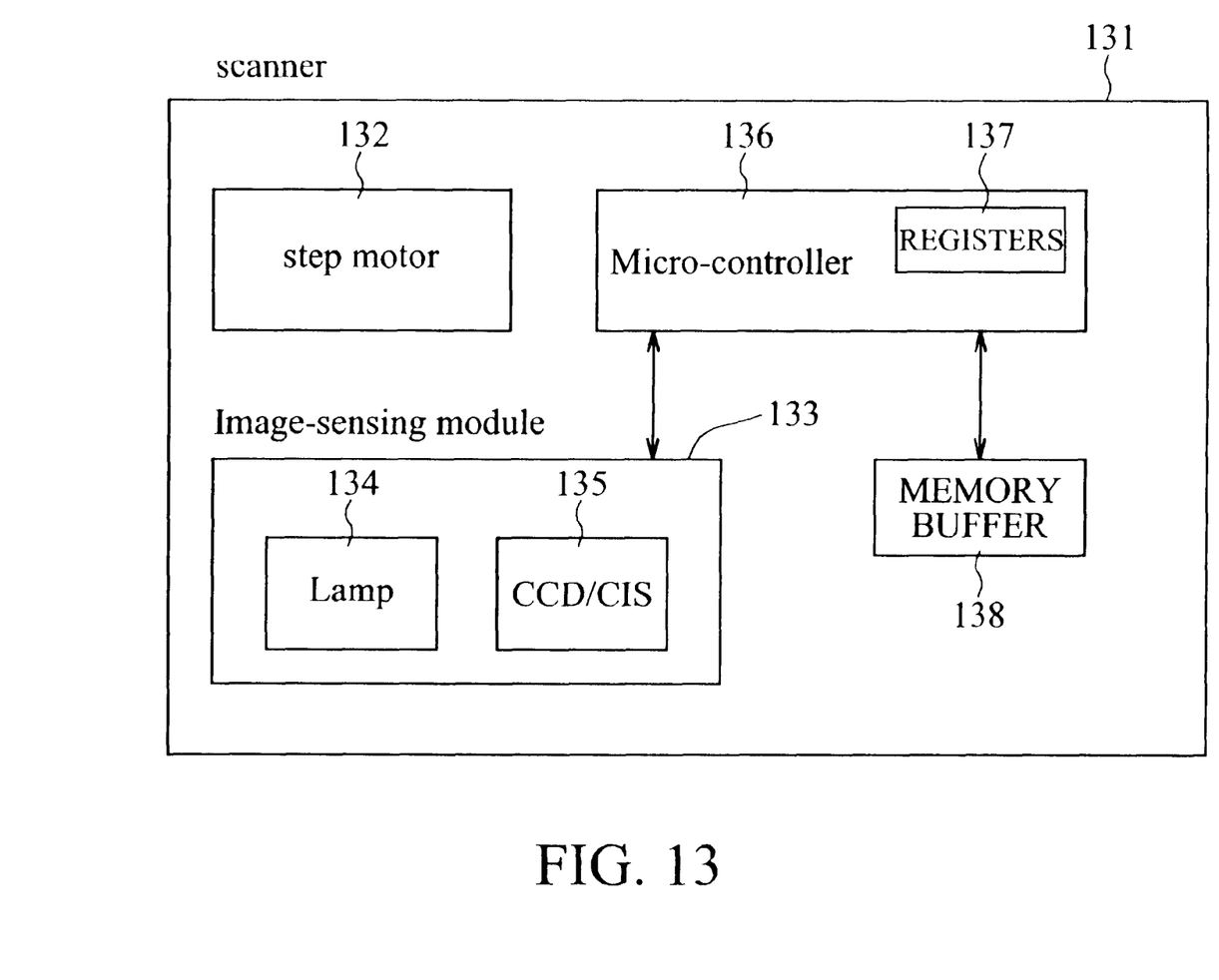
FIG. 13 is a scanner 131, which contains a step motor 132, an image-sensing module 122, a micro-controller 136 and a memory buffer 138. There are a lamp 134 and a CCD 136 in the image-sensing module 133.

FIG. 13 is a scanner 131, which contains a step motor 132, an image-sensing module 133, a micro-controller 136 and a memory buffer 138. The micro controller 136 further includes a plurality of registers 137. The method of this invention can be implemented In the micro-controller 136 to control the step motor which carries the image-sensing module.

The method of the invention is used for controlling the rotation of the step motor mounted in a scanner, and thus controlling the movements of the carriage of the scanner. In general, the movements of the carriage include a forward movement at a constant speed during scanning, a backward movement at a high speed during returning, a forward movement at a high speed during pre-scanning, and a back-tracking control when the memory buffer is full. The back-tracking control includes the stages of forward speed-down, backward speed-up, backward constant-speed, backward speed-down, stop, forward speed-up, forward constant-speed, and the like. Only three control parameters are needed for controlling the operations of the above-mentioned scanner of the invention. Hereinafter, the variables CB, TCB, BA, PCN, MCSI, and clockwise rotation flag are all registers.

The control parameters used in the Invention include a pulse count number PCN, a count base CB, and a motor constant speed interval MCSI. The pulse count number PCN is used for determining the cycle of an asynchronous trigger signal. The count base CB has two functions. One is for adjusting the motor speed (serving as an accumulation base of the asynchronous trigger signal). The other is for serving as a speed control in speed-up/down operation of the motor during the back-tracking control. In addition, the third control parameter, the motor constant speed interval MCSI, is used for setting the period of time for the constant speed operation of the motor during the back-tracking control.

The pulse count number PCN is calculated by multiplying the exposure time E_time of the image sensing module of the scanner and the reference frequency R_FREQ together, as shown in Equation (1):

$$PCN = E\_time * R\_FREQ \quad (1).$$

For example, as to a scanner which has a reference frequency of 0.25 MHz and capable of scanning a document of 8.5" at a resolution of 2400 dpi, the CCD (Charge-Coupled Device) of the image sensing module has 20400 (2400*8.5) sensing units. Furthermore, if the data transfer rate of the CCD is 5 MB/s, the exposure time is 4.08 ms (20400/5 (MB/s)). As a result, the pulse count number PCN is 1020 (4.08 ms*0.25 MHz) according to Equation (1).

Figure 1:
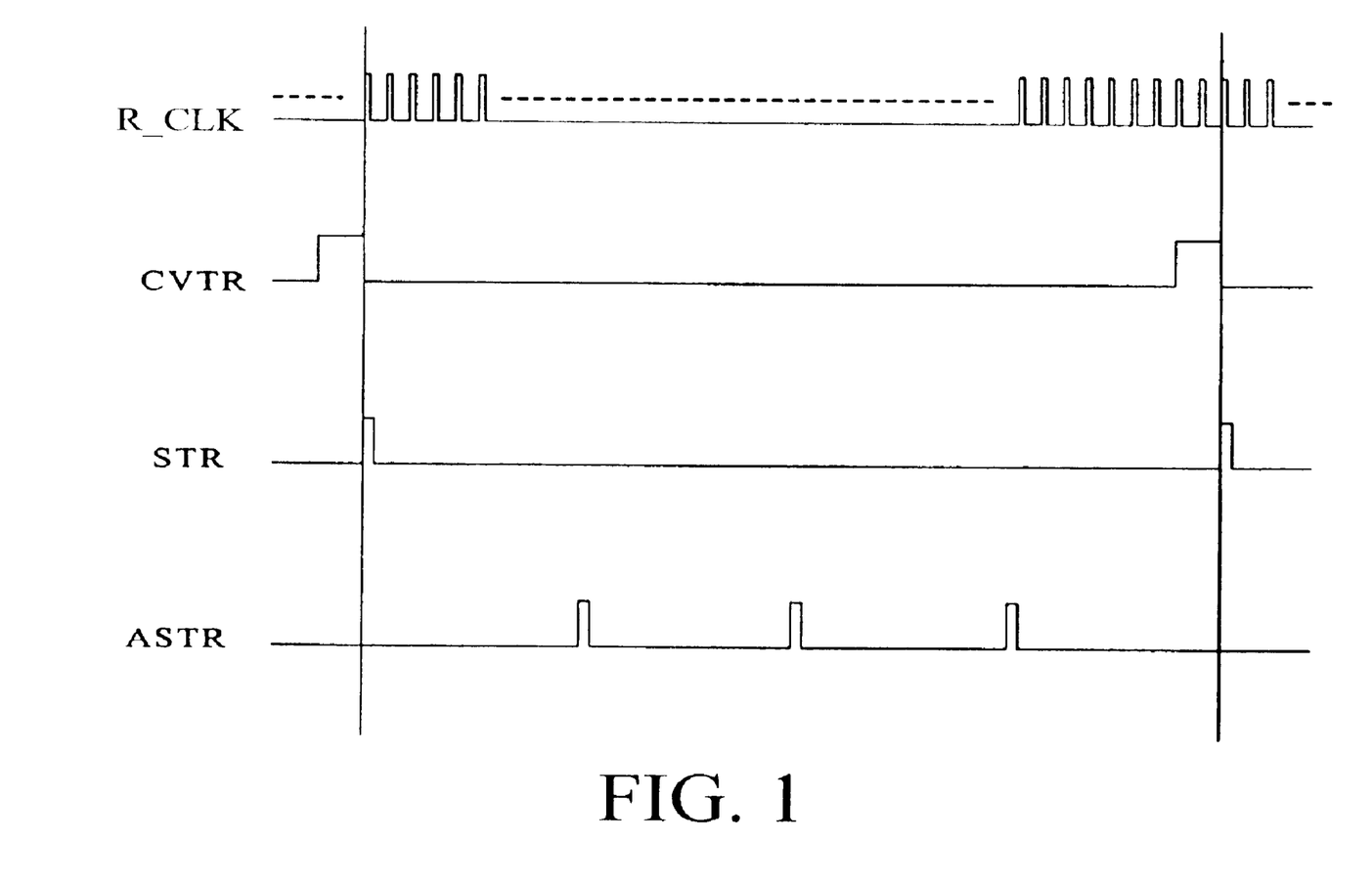
FIG. 1 is a timing chart showing motor trigger signals generated by a step motor control system in accordance with the invention.

FIG. 1 is a timing chart showing the motor trigger signals generated by the method of the invention. The relationship among the reference clock R_CLK, the transfer clock CVTR of the image-sensing module, the synchronous trigger signal STR, and the asynchronous trigger signal ASTR is shown in this figure. A relatively high working frequency is generally provided in every scanner, therefore the reference frequency R_FREQ can be generated by dividing the working frequency. In addition, the image-sensing module in the scanner receives the exposure trigger pulse generated by CVTR every time when the exposure is started. The synchronous trigger signal STR and the asynchronous trigger signal ASTR are used for providing the trigger signal to drive the step motor. Step motor is triggered at the pulses of STR and ASTR.

Referring to FIG. 1, a synchronous trigger signal STR is generated at the rear edge of each exposure trigger signal generated by CVTR and the base accumulator BA is cleared at a front edge of the exposure trigger signal generated by CVTR. The base accumulator BA is an accumulator In the control flow of the method according to the invention. The base accumulator BA is updated corresponding to every reference clock pulse according to the Equation (2):

$$BA \leftarrow BA + CB \quad (2)$$

Equation 2 represents that after adding CB to BA, store the result back to BA. When the base accumulator BA is greater than or equals to the pulse count number PCN, an asynchronous trigger signal ASTR is generated and the base accumulator BA is cleared at the same time. According to the definition of the pulse count number PCN, a reference pulse number set by the pulse count number PCN can be produced during one cycle of the transfer clock CVTR. Accordingly, when the count base CS is 1, since the base accumulator BA will be cleared by the exposure trigger signal generated by CVTR before greater than or equal to the pulse count number PCN, only the synchronous trigger signal STR is served as the motor trigger pulse. When the count base CB is 2, since the base accumulator BA is added 2 every time, a pulse in the asynchronous trigger signal ASTR is produced at about a half position between two adjacent pulses generated by CVTR. In this case, during one cycle of the transfer clock CVTR, two motor trigger pulses are produced by the synchronous trigger signal STR and the asynchronous trigger signal ASTR, result in the speed of the step motor Is doubled. In the example as shown in FIG. 1, since the count base CB is 4, a motor trigger pulse in the asynchronous trigger signal ASTR is produced at above ¼, 2/4, ¾ positions between two adjacent pulses of the corresponding exposure trigger signal generated by CVTR. In this case, during one cycle of the transfer clock CVTR, four motor trigger pulses are produced by the synchronous trigger signal STR and the asynchronous trigger signal ASTR, and the speed of the step motor is quadrupled. Thus, the speed of the step motor can be controlled by the different values of count base CB.

Relationships among the pulse count number PCN, the count base CB, and the resolution (dpi) of the scanner are shown in Table 1. In the above-mentioned example, if the scanner is capable of scanning a document of 8.5" at a resolution of 2400 dpi, the value of pulse count number PCN is 1020 according to Equation (1), and the value of the count base CB is 1. If the resolution is lowered to 1200 dpi or 600 dpi, changing the count base CB into 2 or 4 can speed up the motor movement. Furthermore, the count base CB possesses the functions of accelerating and decelerating the motor. The count base CB can be increased by multiplying both of the pulse count number PCN and count base CB by a base, for example, 2, 4, or 8; therefore, the acceleration and deceleration period of the motor can be changed without influencing the control of the constant speed operation.

TABLE 1

| DIP (Dots Per Inch) | PCN | | | |
|---|---|---|---|---|
| | 1020 | 1020 * 2 | 1020 * 4 | 1020 * 8 |
| 2400 | CB = 1 | CB = 1 * 2 | CB = 1 * 4 | CB = 1 * 8 |
| 1200 | CB = 2 | CB = 2 * 2 | CB = 2 * 4 | CB = 2 * 8 |
| 600 | CB = 4 | CB = 4 * 2 | CB = 4 * 4 | CB = 4 * 8 |

Figure 2:
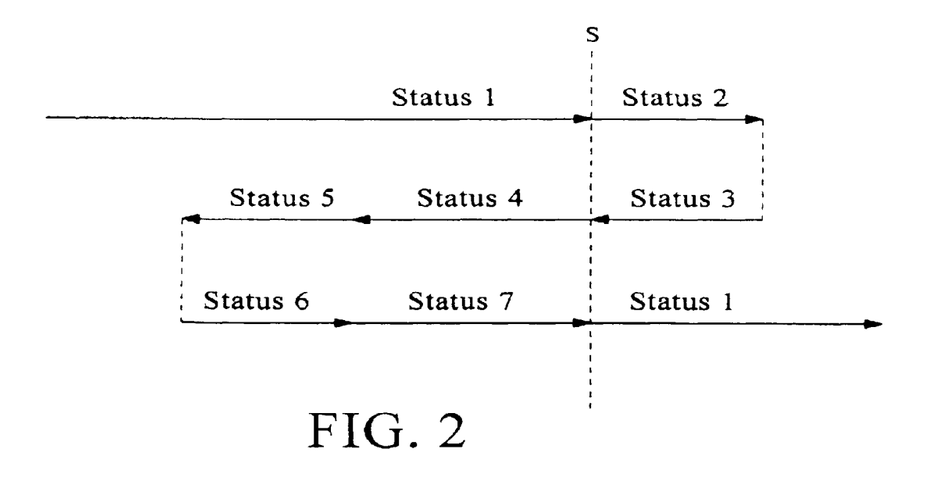
FIG. 2 is a schematic illustration showing positions of a carriage during a back-tracking control flow of the step motor control system in accordance with the invention.

FIG. 2 shows the moving statuses of the carriage when the memory buffer is full and the back-tracking control is enabled. In addition, the relative positions of the carriage in the statuses are also shown in this figure, and the vertical line S denotes the position of the carriage when the back-tracking control is started. As shown in this figure, status 1 is a forward moving status at a constant spew before the back-tracking control of the scanner. Status 2 is a forward moving status at decreasing speeds after the back-tracking control is started. Status 3 is a backward moving status at increasing speeds after the forward moving status at a Constant speed. Status 4 is a backward moving status after the backward moving status at increasing speeds. Status 5 is a backward moving status at decreasing speeds after the backward moving status at a constant speed. Status 6 is a forward moving status at increasing speeds after the backward moving status at decreasing speeds. Status 7 is a forward moving status at a constant speed after the forward moving status at increasing speeds. The step motor temporarily halts between statuses 5 and 6 in order to wait for the data transfer within the memory. The control flow of each status will be described with reference to FIGS. 3 to 9, and FIGS. 4 to 9 denote the back-tracking control flow corresponding to statuses 2 to 7. The control flow in each of the statuses 2 to 7 is performed by changing the temporary count base TCB in order to control the speed of the step motor.

Figure 3:
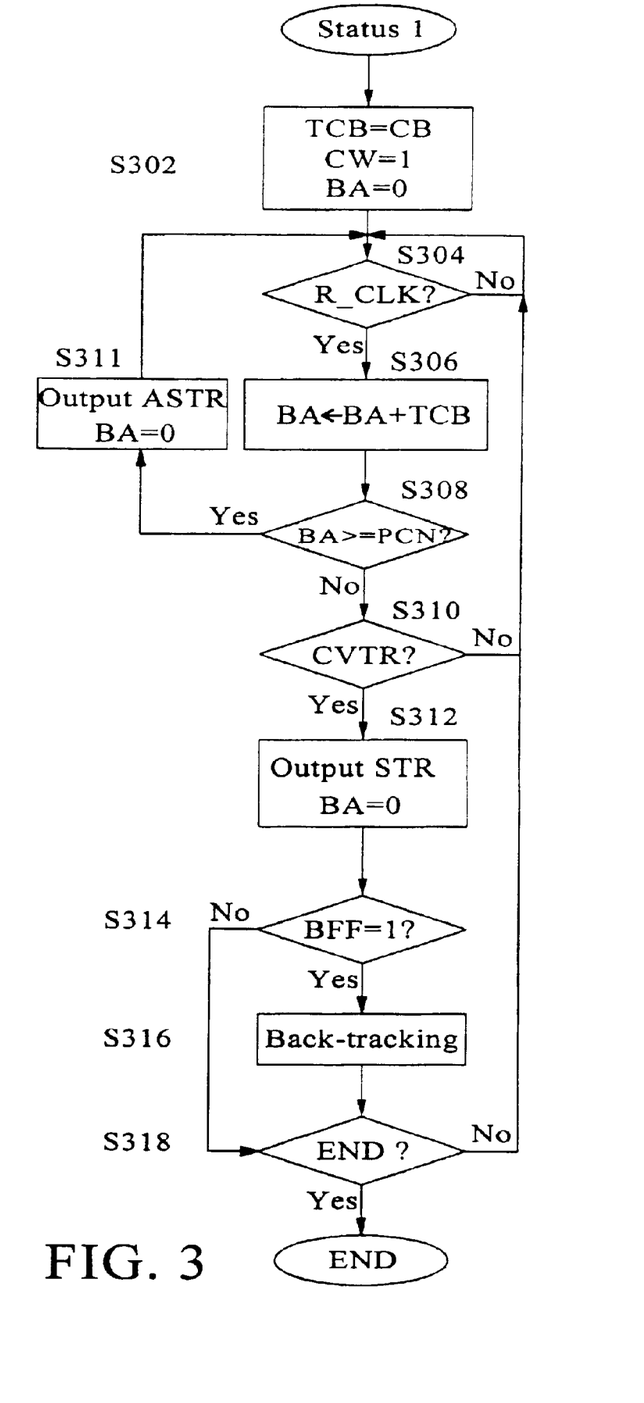
FIG. 3 is a control flowchart showing main operations of the stop motor control system in accordance with the invention.

The control flow of the invention will be described in detail with reference to FIGS. 3 to 9. FIG. 3 is a control flowchart showing the motor trigger signal In the control system of the invention. Once the scanner starts to drive the motor to rotate, the control flow is performed. The steps of the control flow are described in the following:

step S302: set a clockwise rotation flag to 1, assign the count base CB to the temporary count base TCB, and clear the base accumulator BA, that is, CW=1, TCB=CB, and BA=0;

step S304: detect weather there is a reference pulse in R_CLK or not; if the reference pulse in R_CLK is detected, jump to step S306; if not, continue the detection;

step S306: add the temporary count base TCB to the value of base accumulator BA, that is, BA←BA+TCB;

step S308: compare whether the base accumulator BA is greater or equal to the pulse count number PCN; if the base accumulator BA is greater or equal to the pulse count number PCN, jump to step S311; if not, jump to step S310 (i.e., the equation "BA←BA+TCB" means after adding TCB to BA, store the result back to BA. Since TCB equals to CB and the control flow goes to step 310 or stop 311 depending on "BA>=PCN7", the repeated number of this process is determined by CB and PCN);

step S310: detect whether there is a exposure trigger signal generated by CVTR; if yes, jump to step S312; if not, jump to step S304;

step S311: send an asynchronous trigger signal ASTR, clear the base accumulator BA, and jump to stop S304;

step S312: send a synchronous trigger signal STR and clear the base accumulator BA;

step S314: detect whether the memory buffer is full or not, that is, detect whether the buffer full flag BFF is 1 or not; if yes, jump to step S316; if not, jump to step S318;

step S316: enable the back-tracking control; and step S318: determine whether the control is ended or not; if yes, terminate the control; if not, jump to step S304.

Figure 4:
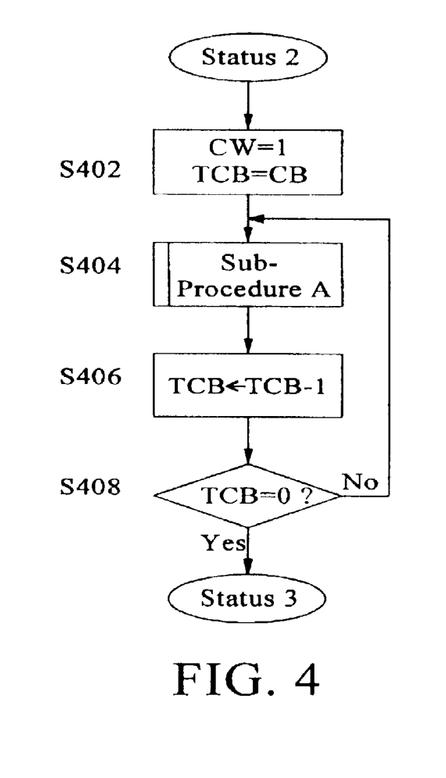
FIG. 4 is a control flowchart showing the speed-down status of the step motor control system of the invention during the back-tracking control.

FIG. 4 is a control flowchart showing the forward moving status (status 2) at decreasing speeds after the back-tracking control of the scanner is started in accordance with the control system of the invention The steps are described in the following:

step S402: set the clockwise rotation flag to 1 and assign count base CB to the temporary count base TCB, that is, CW=1, and TCB=CB;

step S404: perform a sub-procedure A to generate the asynchronous trigger signal ASTR;

step S406: subtract 1 from the temporary count base TCB, that is, TCB←TCB−1; and step S840: compare whether the temporary count base TCB is 0 or not; if TCB is 0, jump to the control steps in status 3; if not, jump to step S404. The equation "TCB←TCB−1" represents after subtracting 1 from TCB, store the result back to TCB. Since TCB equals to CB, this process will repeat CB times.

Figure 5:
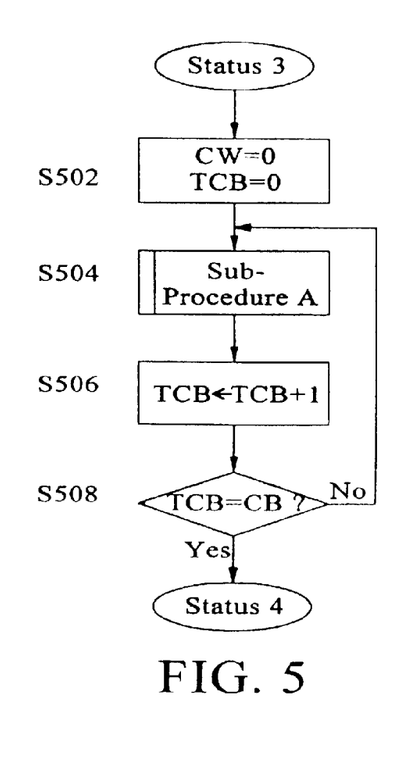
FIG. 5 is a control flowchart showing the counterclockwise speed-up status of the step motor control system of the Invention during the back-tracking control.

FIG. 5 is a control flowchart showing the backward moving status (status 3) at increasing speeds after the back-tracking control of the scanner is stared in accordance with the control system of the invention. The steps are described in the following:

step S502: set the clockwise rotation flag to 0 and clear the temporary count base TCB, that is, CW=0, and TCB=0;

step S504: perform the sub-procedure A to generate the asynchronous trigger signal ASTR;

step S506: add 1 to the temporary count base TCB, that is, TCB←TCB+1; and step S508 compare whether the temporary count base TCB is equal to the count base CB; if yes, jump to the control steps in status 4; if not, jump to step S504. The equation "TCB←TCB+1" means after adding 1 to TCB, store the result back to TCB. Since TCB equals to 0 and the control flow goes to status 4 when TCB equals to CB, this process will repeat CB times.

Figure 6:
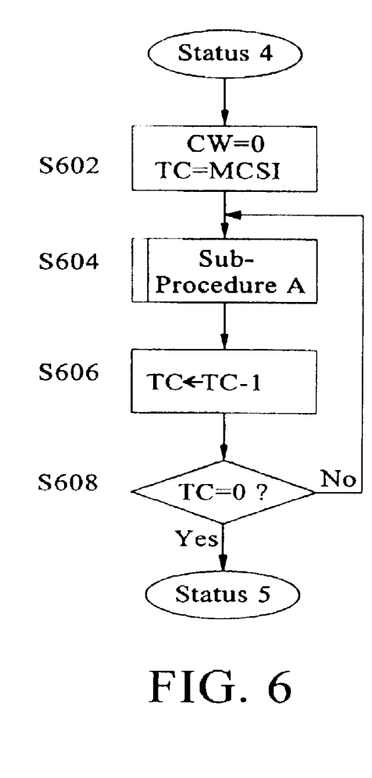
FIG. 6 is a control flowchart showing the counterclockwise constant-speed status of the step motor control system of the invention during the back-tracking control.

FIG. 6 is a control flowchart showing the backward moving status (status 4) at a constant speed after the back-tracking control of the scanner is started in accordance with the control system of the invention. The steps are described in the flowing:

step S602: set the clockwise rotation flag to 0 and assign the motor constant speed interval MCSI to the temporary count TC to, that is, CW=0, and TC=MCSI;

step S604: perform the sub-procedure A to generate the asynchronous trigger signal ASTR;

step S606: subtract 1 from the temporary count TC, that is, TC←TC−1; and step S608: compare whether the temporary count TC is 0 or not; if TC is 0, jump to the control steps in status 5; if not, jump to step S604. The equation "TC←TC−1" means after subtracting 1 from TC, store the result back to TC. Since TC equals to MCSI and the control flow goes to status 5 when TC equals to 0, this process will repeat MCSI times.

Figure 7:
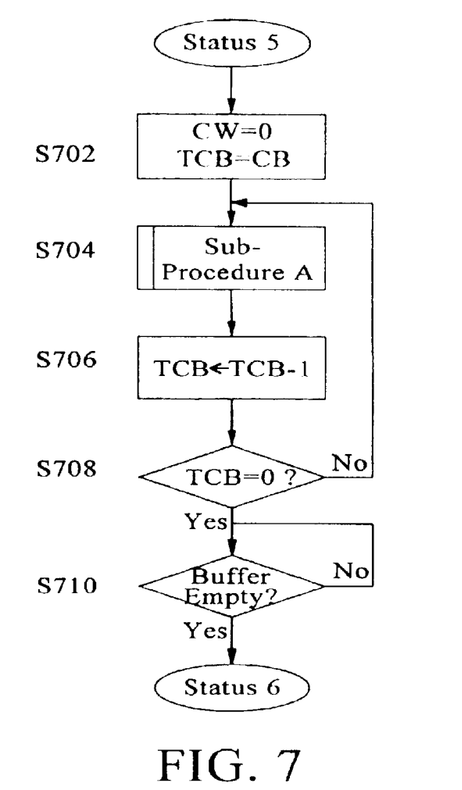
FIG. 7 is a control flowchart showing the counterclockwise speed-down status of the step motor control system of the invention during the back-tracking control.

FIG. 7 is a control flowchart showing the backward moving status (status 5) at decreasing speeds after the back-tracking control of the scanner is started in accordance with the control system of the invention. The steps are described in the following:

step S702: set the clockwise rotation flag to 0 and set the temporary count base TCB to the value of count base CD, that is, CW=0, and TCB=CB;

step S704: perform the sub-procedure A to generate the asynchronous trigger signal ASTR;

step S706: subtract 1 from the temporary count base TCB, that is, TCB←TCB−1;

step S708: compare whether the temporary count base TCB is 0 or not; if TCB is 0, jump to step S710; if not, jump to step S704 (i.e., the equation "TCB←TCB−1" means after subtracting 1 from TCB, store the result back to TCB. Since TCB equals to CB and the control flow goes to status 6 when TCB equals 0, this process will repeat CB times); and step S710: detect whether the memory buffer of the scanner is available or not; if yes, jump to the control steps in status 6.

Figure 8:
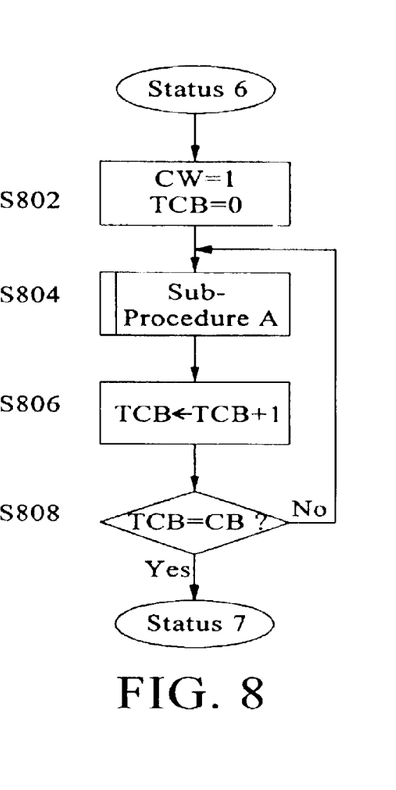
FIG. 8 is a control flowchart showing the clockwise speed-up status of the step motor control system of the invention during the back-tracking control.

FIG. 8 is a control flowchart showing the backward moving status (status 6) at increasing seeds after the back-tracking control of the scanner is started in accordance with the control system of the invention. The steps are described in the following:

step S802: set the clockwise rotation flag to 1 and clear the temporary count base TCB, that is, CW=1, and TCB=0;

step S804: perform the sub-procedure A to generate the asynchronous trigger signal ASTR;

step S806: add 1 to the temporary count base TCB, that is, TCB←TCB+1; and step S808: compare whether te temporary count base TCB is equal to the count base CB or not; if yes, jump to the control steps in status 7; if not, jump to step S804. The equation "TCB←TCB+1" means after adding 1 to TCB, store the result back to TCB. Since TCB equals to 0 and the control flow goes to status 7 when TCB equals to CB this process will repeat CB times.

Figure 9:
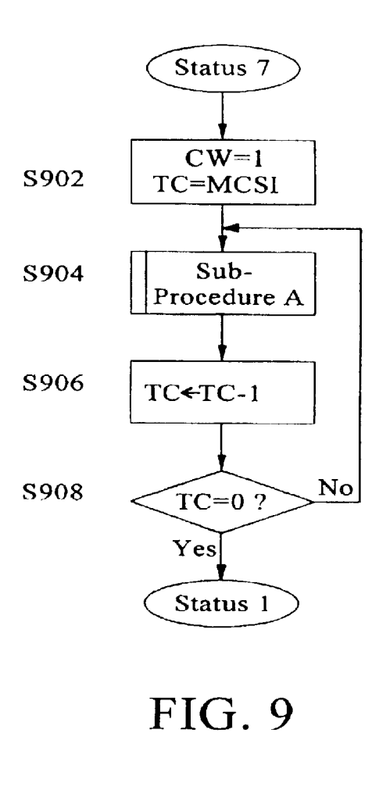
FIG. 9 is a control flowchart showing the clockwise constant-speed status of the step motor control system of the invention during the back-tracking control.

FIG. 9 is a control flowchart showing the backward moving status (status 7) at a constant speed after the back-tracking control of the scanner is started in accordance with the control system of the invention. The steps are described in the following:

step S902: set the clockwise rotation flag to 1 and assign the motor constant speed interval MCSI to the temporary count TC, that is, CW=1, and TC=MCSI;

step S904: perform the sub-procedure A to generate the asynchronous trigger signal ASTR;

step S906: subtract 1 from the temporary count TC, that is, TC←TC−1; and step S908: compare whether the temporary count TC is 0 or not, if yes, jump to the control steps in status 1; if not, jump to step S904: The equation "TC←TC−1" means after subtracting 1 from TC, store the result back to TC. Since TC equals to MCSI and the control flow goes to status 1 when TC equals to 0, this process will repeat MCSI times. In the control flow of the statuses 2 to 7, the variation of the value of the temporary count base TCB is mainly controlled. The speed of the step motor can be effectively controlled by different values of the temporary count base TCB.

Figure 10:
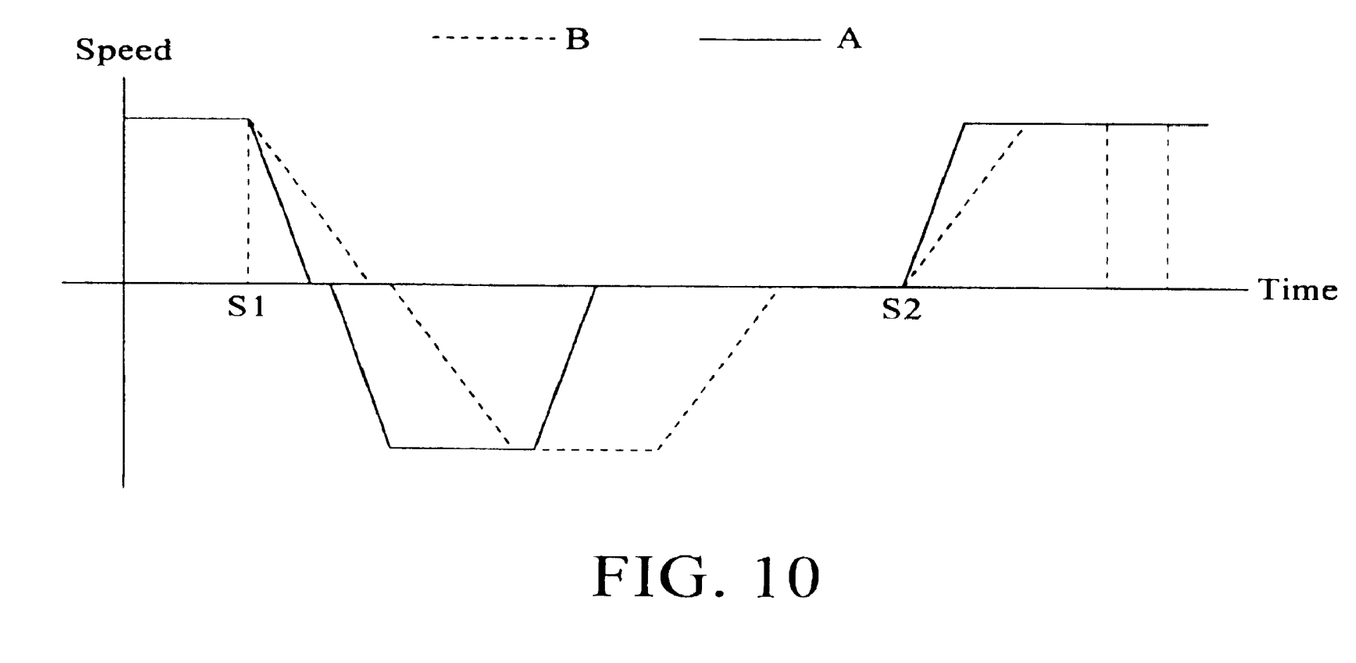
FIG. 10 is a graph showing the relationship between the motor speed and the time during the back-tracking control in the step motor control system of the invention.

FIG. 10 shows the acceleration and deceleration curves of scanning the document of the same resolution under different values of count bases CBs. It shows the conditions when the motor is stopped and started in the back-tracking control, and the solid line A indicates a smaller count base CB, while the dash line B indicates a larger count base CB. It can be understood from the figure that the halt time and starting time get longer as the count base CB gets larger. Thus, an appropriate count base CB can be selected according to the design demands. Table 1 shows the relationships among the pulse count number PCN, the count base CB, and the resolution (dpi) of the scanner. If the resolution of the scanner is 2400 dpi and the pulse count number PCN is 1020, the value of the count base CB is 1. In this case, the halt time and starting time of the scanner is only one cycle of the asynchronous trigger signal ASTR. The count base CB can be increased if the halt time a starting time of the motor needs to be increased. For example, the count base CB can be increased to four times as large as the original count base CB. In this case, the halt time and starting time of the motor increases to four times of the original time. As shown in Table 1, when the count base CB and the pulse count number PCN are increased, both of them need to be multiplied by the same number to maintain the same constant speed in status 4 and status 7 of FIG. 2.

Figure 11:
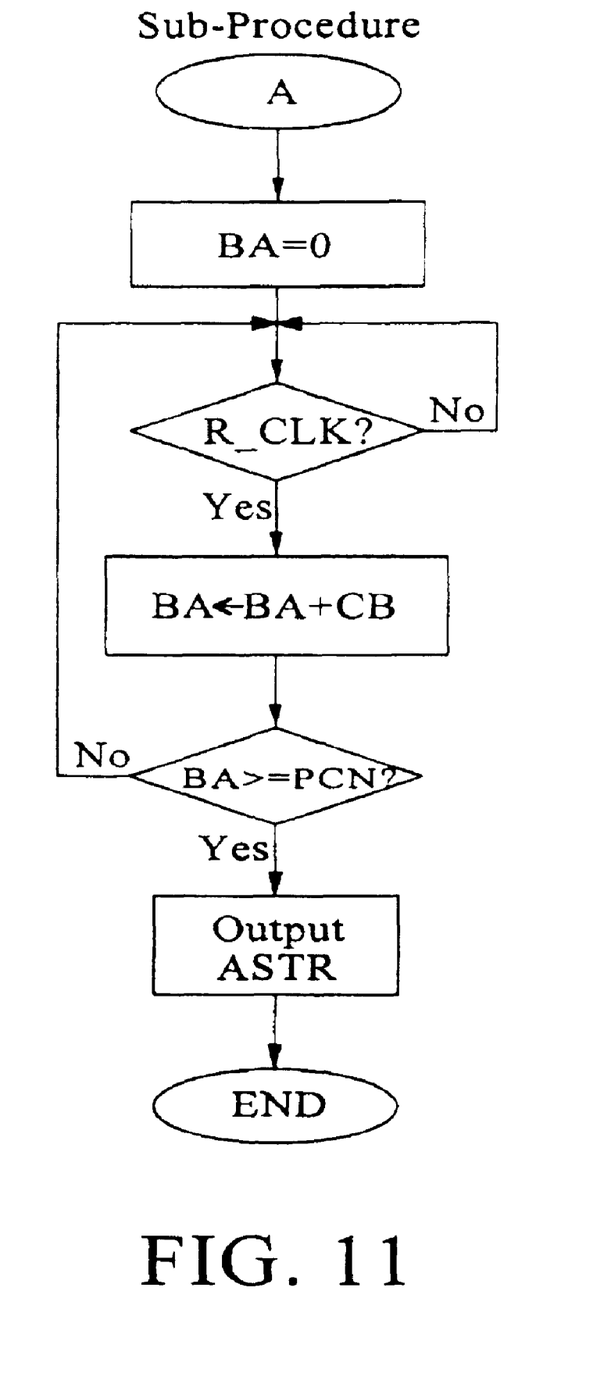
FIG. 11 is a control flowchart showing the sub-procedure A of the Invention.

FIG. 11 shows a control flow of a sub-procedure A. The control flow is performed by adding the count base CB to the base accumulator BA when detects each of the reference frequency pulses, that is, BA←BA+CB. Then, the system generates an asynchronous trigger signal ASTR when the base accumulator BA is greater than or equal to the pulse count number PCN. The repeated number of this process is determined by CB and PCN.

Figure 12:
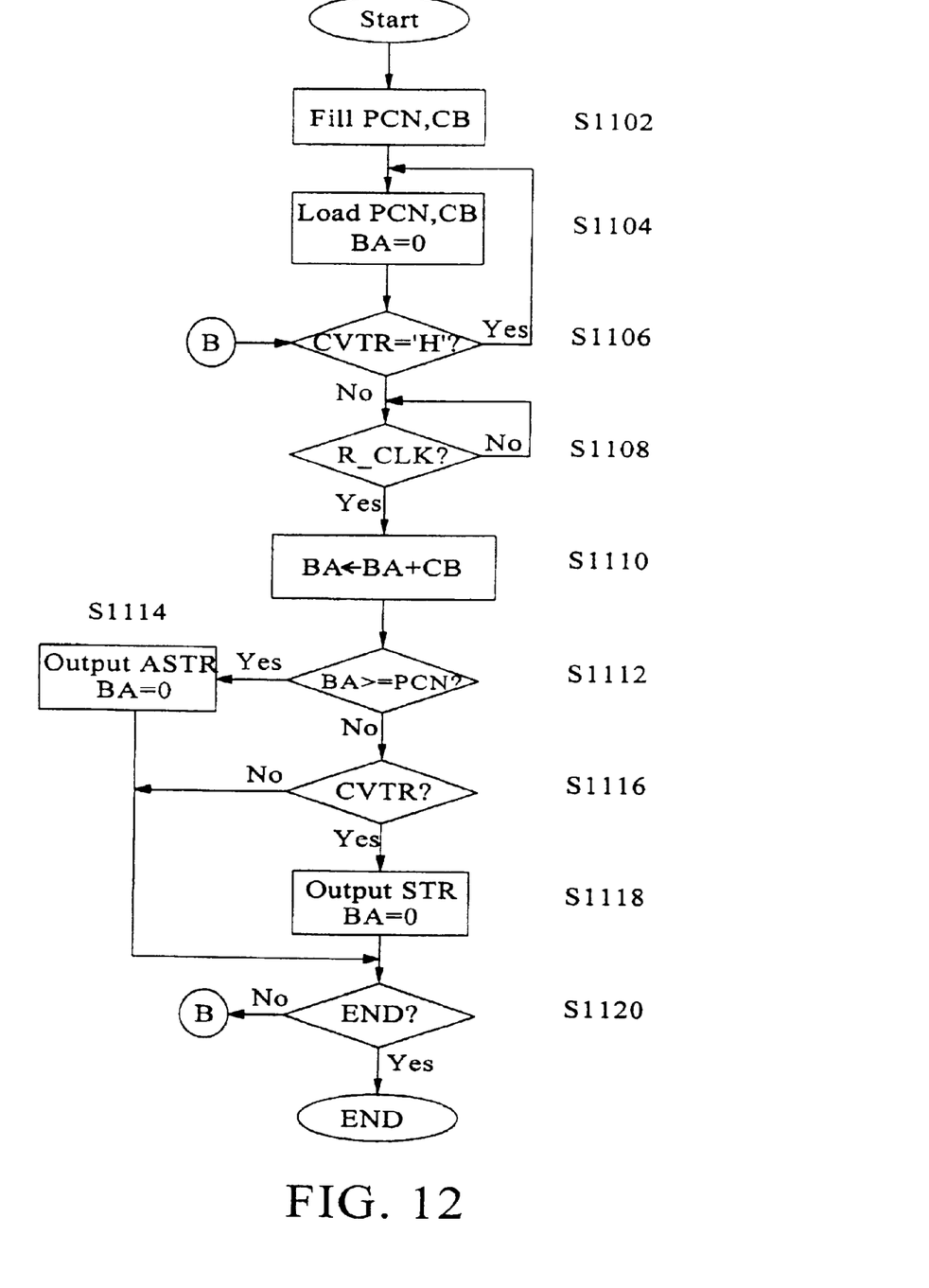
FIG. 12 is a control flowchart showing the clockwise constant-speed status of the step motor control system of the invention during a speed-up period of the pre-scanning.

In addition, common scanners provide the function of pre-scanning. When performing the function of pre-scanning, since the resolution is relatively low, for example, 75 dpi, the speed of the carriage is relatively high. However, if the step motor cannot effectively speed up the adjustment to overcome the static fiction force, the state of high-speed operation cannot be achieved. In the step motor control system of the invention, the step motor may reach the state of high-speed operation in a short period of time by controlling the count base CB or the pulse count number PCN. FIG. 12 shows a flowchart of the speed-up adjustment. The control flow of FIG. 12 is described in the following:

step S1102: fill a plural sets of desired pulse count number PCN and count base CB, which are needed, into an accelerating control table by a host (not shown);

step S1104: load a set of pulse count number PCN and count base CB, and clear the base accumulator BA to 0;

step S1106: detect whether the exposure trigger signal generated by CVTR is high or not; if yes, jump to the step S1104; if not, jump to the next step;

step S1108: detect whether there is a reference pulse R_CLK or not; if yes, proceed the next step; if not, continue the detection;

step S1110: add the count base CB to the base accumulator BA, that is, BA←BA+CB;

step S1112: compare whether the base accumulator BA is greater than or equal to the pulse count number PCN; if BA is greater than or equal to the pulse count number PCN, jump to step S1114; if not, jump to step S1116;

step S1114: send out an asynchronous trigger signal ASTR, clear the base accumulator BA, and jump to step S1120;

step S1116: detect whether there is a negative edge variation (signal from high to low) in the transfer clock CVTR or not; if not, jump to step S1120; if yes, proceed the next step;

step S1118: send out a synchronous trigger signal STR, clear the base accumulator BA, and jump to step S1120;

step S1120: compare whether the control should be ended or not; if not, jump to step S1106; if yes, terminate the step.

According to the above mentioned control flow, it is only needed to fill a plurality sets of proper pulse count number PCN and count base CB into the accelerating control table, and then, the motor is assured to be started by sequentially loading a set of pulse count number PCN and count base CB each time when the transfer clock CVTR is high. It should be noted that the pulse count number PCN and the count base CB which are filled into the accelerating control table can be changed in various ways described below.

The first way is to keep the pulse count number PCN constant and to adjust the value of count base CB. That is, keeping the pulse count number PCN constant and sequentially increasing the count base CB, for example, increasing the count base CB from 1 to 32. In this case, since the count base CD gradually increases from 1 to 32, the resolution of the scanner is 2400 dpi when the value of the count base CB is 1, while the resolution of the scanner is 75 dpi when the value of the count base CB is 32. Consequently, after the control flow is over, the motor keeps on rotating at a speed for the 75 dpi scanning to perform the quick operation of per-scanning. The second way is to adjust the pulse count number PCN and keep the count base CB constant. That is, keeping the count base CB constant and gradually decreasing the pulse count number PCN. The third way is to adjust the pulse count number PCN and the count base CB at the same time.

In the step motor control system of the invention, only three control parameters are needed for controlling the speed (including the constant speed of the normal operation and the acceleration operation) of the step motor of the scanner and supporting the back-tracking operation. In addition, the parameters can also be easily set. Moreover, the gate number of the IC can be saved because only three parameter are used. Furthermore, when the step motor control system of the invention is applied to a so-called line-rate scanner such as a CIS (Contact Image Sensor) scanner, the above-mentioned control method can be used by only dividing the reference frequency by 3 or multiplying the pulse count number PCN by 3 and omit the two of the three exposure trigger signals generated by CVTR.

What is claimed is:

1. A method for controlling a step motor of a scanner, wherein the scanner includes a microcontroller, a memory buffer and an image-sensing module, the micro-controller having a CB (count base) register, a PCN (pulse count number) register, an MCSI (motor constant speed interval) register, a TCB (temporary count base) register, a BA (base accumulator) register and a clockwise rotation flag, said method comprising the steps of:

generating a reference pulse in response to an extended oscillatory signal;

generating a synchronous trigger signal in response to each exposure trigger signal generated by the image-sensing module and clearing the BA register;

accumulating the BA register by adding the value of the CB register in response to the reference pulse;

generating an asynchronous trigger signal and clearing the BA register when the BA register is greater than or equal to the PCN register; and enabling a back-tracking control when the memory buffer is full.

2. The method according to claim 1, wherein the back-tracking control comprises the steps of:

assigning the value of the CB register to the TCB register and enabling a clockwise rotation flag;

performing a speed-down control by repeatedly executing a sub-procedure A and subtracting 1 from the TCB register until the TCB register becomes 0;

performing a counterclockwise speed-up control by disabling the clockwise rotation flag and repeatedly executing the sub-procedure A and adding 1 to the TCB register until the TCB register is equal to the CB register;

performing a counterclockwise constant-speed control by repeatedly executing the sub-procedure A for the times stored in the MCSI register;

performing a counterclockwise speed-down control by repeatedly executing the sub-procedure A and subtract 1 from the TCB register until the TCB register becomes 0;

performing a clockwise speed-up control by enabling the clockwise rotation flag and repeatedly executing the sub-procedure A and adding 1 to the TCB register until the TCB register is equal to the CB register; and performing a clockwise constant-speed control by repeatedly executing the sub-procedure A for a times stored in the MCSI register, wherein the sub-procedure A comprises:

accumulating the BA register by adding the value of the CB register in response to each the reference pulse; and outputting the asynchronous trigger signal and clearing the BA register when the BA register is greater than or equal to the PCN register.

3. The method according to claim 2, wherein the speed at the steps of the speed-up control and the speed-down control are adjusted by multiplying the PCN register and the CB register by an integer simultaneously.

4. The method according to claim 3, further comprising a speed-up control procedure which can apply to a motor starting control when the scanner is pre-scanning and in a backward movement, the speed-up control procedure comprising the steps of:

(a) filling a plural sets of the PCN and CB registers to an accelerating control table;

(b) setting a set of the PCN and CB registers from the accelerating control table and clearing the BA register;

(c) generating the synchronous trigger signal and setting a next set of the PCN and CB registers from the accelerating control table and clearing the BA register, when the exposure trigger signal generated by the image-sensing module is detected;

(d) adding the CB register to the BA register when the reference pulse is detected, and generating the asynchronous trigger signal and clearing the BA register when the BA register is greater than or equal to the PCN register; and (e) performing the steps (c) and (d) repeatedly.

5. The method according to claim 3, wherein the reference pulse is divided by 3 and the two of the three exposure trigger signals generated by the image-sensing module are omitted when the control method is applied to a line rate scan.

6. The method according to claim 3, wherein the reference pulse is multiplied by 3 and the two of the three exposure trigger signals generated by the image-sensing module are omitted when the control method is applied to a line rate scan.

7. A method for controlling a step motor of a seer, wherein the scanner included a micro-controller receiving a reference pulse, the step motor, a memory buffer and an image-sensing module, said method comprising the steps of:

(a) generating a synchronous trigger signal in response to each of an exposure trigger signal generated by the image-sensing module;

(b) generating an asynchronous trigger signal in response to each of a plurality of the reference pulses;
wherein the number of the plurality of the reference pulses which are determined by a count base CB and a pulse count number PCN; and (c) enabling a back-tracking control when the memory buffer is fill.

8. The method according to claim 7, wherein the back-tracking control comprises the steps of:

(a) performing a clockwise speed-down control by repeatedly executing a sub-procedure A for the times stored in the count base CB;

(b) performing a counterclockwise speed-up control by repeatedly executing the sub-procedure A for the times stored in the count base CB;

(c) performing a counterclockwise constant-speed control by repeatedly executing the sub-procedure A for the times stored in a motor constant speed interval MCSI;

(d) performing a counterclockwise speed-down control by repeatedly executing the sub-procedure A for the times stored in the count base CB;

(e) performing a clockwise speed-up control repeatedly executing the sub-procedure A for the times stored in the count base CB; and (f) performing a clockwise constant-speed control by repeatedly executing the sub-procedure A for the times stored in the motor constant speed interval MCSI;

wherein the sub-procedure A comprises:

generating the asynchronous trigger signal in response to a plurality of the reference pulses; and
wherein the plurality of the reference pulses is determined by the count base CB and the pulse count number PCN.

9. The method according to claim 8, wherein an acceleration of the speed-up control and the speed-down control are adjusted by multiplying the pulse count number PCN and the count base CB by an integer simultaneously.

10. The method according to claim 9, further comprising a method of a changing acceleration of the step motor, said method comprising the steps of:

(a) filling a plural sets of the pulse count number PCN and the count base CB to an accelerating control table;

(b) loading a set of pulse count number PCN and count base CB from the accelerating control table;

(c) generating the synchronous trigger signal and loading a next set of pulse count number PCN and count base CB in response to the exposure trigger signal generated by the image-sensing module; and (d) generating the asynchronous trigger signal in response to a plurality of the reference pulses;
wherein the plurality of the reference pulses is determined by the next set of the count base CB and the pulse count number PCN; and (e) performing the steps (c) and (d) repeatedly.

11. The method according to claim 9, wherein the frequency of the reference pulse is divided by 3 and the two of the three exposure trigger signals generated by the image-sensing module are omitted when the control method is applied to a line rate scan.

12. The method according to claim 9, wherein the pulse count number PCN is multiplied by 3 and the two of the three exposure trigger signals generated by the image-sensing module are omitted when the control method is applied to a line rate scan.

* * * * *